United States Patent
Bond (10) Patent No.: US 7,331,215 B2
(45) Date of Patent: Feb. 19, 2008

(54) DEPLOYMENT OF EQUIPMENT INTO FLUID CONTAINERS AND CONDUITS

(75) Inventor: Anthony Bond, Wiltshire (GB)

(73) Assignee: WRc plc, Wiltshire (GB)

( * ) Notice: Subject to any disclaimer, the term of this patent is extended or adjusted under 35 U.S.C. 154(b) by 136 days.

(21) Appl. No.: 11/088,416

(22) Filed: Mar. 24, 2005

(65) Prior Publication Data

US 2005/0172737 A1    Aug. 11, 2005

Related U.S. Application Data

(60) Division of application No. 10/093,337, filed on Mar. 7, 2002, now Pat. No. 6,889,703, which is a continuation of application No. PCT/GB00/03434, filed on Sep. 7, 2000.

(30) Foreign Application Priority Data

Sep. 7, 1999    (GB) ................................. 9921124.5

(51) Int. Cl.
*G01M 3/04* (2006.01)
(52) U.S. Cl. ..................... 73/40.5 A; 73/592
(58) Field of Classification Search ............... 73/865.8, 73/40.5 A, 49.1, 587, 592; 181/101, 125
See application file for complete search history.

(56) References Cited

U.S. PATENT DOCUMENTS

| 1,470,733 | A | * | 10/1923 | Hayes ......................... 367/123 |
| 1,886,914 | A | * | 11/1932 | Slichter ....................... 73/592 |
| 3,007,340 | A | * | 11/1961 | Kraftson ...................... 73/866.5 |
| 3,413,653 | A |  | 11/1968 | Wood |
| 3,478,576 | A |  | 11/1969 | Bogle |

(Continued)

FOREIGN PATENT DOCUMENTS

EP          0 442 626 A2      8/1991

(Continued)

OTHER PUBLICATIONS

International Search Report for International Application No. PCT/GB00/03434.

(Continued)

*Primary Examiner*—Robert Raevis
(74) *Attorney, Agent, or Firm*—Smith IP Services, P.C.

(57) ABSTRACT

Apparatus for deploying equipment in a fluid container or fluid conduit comprises a fluid housing having an outlet aperture, the fluid housing being adapted to be secured to the container or conduit such that the outlet aperture is in fluid communication with an aperture in the container or conduit. The apparatus further includes a piston in the fluid housing dividing the fluid housing into first and second fluid chambers, the second fluid chamber being in fluid communication with the interior of the container or conduit via the outlet aperture when the fluid housing is secured in fluid communication with the container or conduit. The piston is movable within the fluid housing toward the outlet aperture in response to increases of fluid pressure in the first fluid chamber. The apparatus further includes a guide means for guiding deployment of the equipment into the container or conduit. The guide means is secured to the piston, whereby movement of the piston within the fluid housing can move the guide means at least partially into the container or conduit through said outlet aperture.

11 Claims, 8 Drawing Sheets

U.S. PATENT DOCUMENTS

| | | | |
|---|---|---|---|
| 3,561,256 A | | 2/1971 | Bustin et al. |
| 3,838,593 A | | 10/1974 | Thompson |
| 4,083,229 A | * | 4/1978 | Anway .................... 73/40.5 A |
| 4,282,894 A | * | 8/1981 | Mills et al. ................. 137/317 |
| 4,309,576 A | * | 1/1982 | Corrigan .................... 381/161 |
| 4,457,163 A | * | 7/1984 | Jackle ..................... 73/40.5 A |
| 4,485,668 A | * | 12/1984 | Hudson et al. ........... 73/40.5 A |
| 4,631,967 A | * | 12/1986 | Welker ...................... 73/866.5 |
| 4,644,791 A | * | 2/1987 | Sonoda et al. ...... 254/134.3 FT |
| 4,828,767 A | * | 5/1989 | Smirnoff .................... 137/318 |
| 4,916,797 A | * | 4/1990 | Strommen et al. ......... 73/866.5 |
| 5,121,644 A | * | 6/1992 | Grey et al. .............. 254/134.4 |
| 5,341,670 A | * | 8/1994 | Brook et al. ............. 73/40.5 A |
| 5,385,060 A | | 1/1995 | Wang |
| 5,612,499 A | | 3/1997 | Andrew et al. |
| 5,639,975 A | * | 6/1997 | Waterman .................. 73/866.5 |
| 5,756,906 A | * | 5/1998 | Welker ...................... 73/866.5 |
| 5,922,942 A | * | 7/1999 | Roy ........................ 73/40.5 A |
| 5,936,168 A | * | 8/1999 | Welker ...................... 73/866.5 |
| 5,987,990 A | * | 11/1999 | Worthington et al. ......... 73/592 |
| 5,992,250 A | * | 11/1999 | Kluth et al. ................ 73/866.5 |
| 5,996,430 A | * | 12/1999 | Bellis, Sr. ................. 73/866.5 |
| 6,338,359 B1 | * | 1/2002 | Welker ....................... 137/317 |
| 6,725,705 B1 | * | 4/2004 | Huebler et al. .......... 73/40.5 A |
| 6,820,016 B2 | * | 11/2004 | Brown et al. ................. 702/51 |

FOREIGN PATENT DOCUMENTS

| | | |
|---|---|---|
| EP | 0 450 814 A1 | 10/1991 |
| EP | 0450814 | 7/1994 |
| EP | 0442626 | 8/1995 |
| GB | 2 334 079 A | 2/1996 |
| GB | 2334079 | 8/1999 |
| GB | 2339283 | 1/2000 |
| JP | 600257338 | 12/1985 |
| JP | 610017929 | 1/1986 |
| JP | 030273127 | 12/1991 |
| JP | 6121425 | 4/1994 |
| WO | WO 01/18442 | 3/2001 |
| WO | WO 01/18442 A2 | 3/2001 |
| WO | WO 01/18442 A3 | 3/2001 |

OTHER PUBLICATIONS

International Preliminary Examination Report for International Application No. PCT/GB00/03434.

Search Report for UK application No. GB 0228116.0.

International Search Report for PCT/GB00/03434.

International Preliminary Examination Report for PCT/GB00/03434.

Office Action for U.S. Appl. No. 10/093,337 dated Jun. 11, 2003.

Office Action for U.S. Appl. No. 10/093,337 dated Apr. 5, 2004.

Office Action for U.S. Appl. No. 10/093,337 dated Jul. 10, 2003.

* cited by examiner

DEPLOYMENT OF EQUIPMENT INTO FLUID CONTAINERS AND CONDUITS

CROSS-REFERENCE TO RELATED APPLICATIONS

The present application is a division of application Ser. No. 10/093,337 filed Mar. 7, 2002, now U.S. Pat. No. 6,889,703, which is a continuation of prior international application No. PCT/GB00/03434, filed Sep. 7, 2000, which claims the benefit of the filing date of prior United Kingdom patent application No. 9921124.5, filed Sep. 7, 1999. The disclosures of these prior applications are incorporated herein by this reference.

The present invention relates to the deployment of equipment into fluid containers or conduits, especially pressurised fluid containers or conduits. The invention is useful for deploying equipment into a wide variety of different containers and conduits, including fluid tanks and pipes. The invention is particularly useful for deploying equipment into water mains.

The invention also relates to a winch assembly which can be used to force an elongate member such as a cable into a fluid container or fluid conduit against a force resisting such movement.

Equipment to drill and tap into pressurised pipes is used routinely to enable connections to be made and to allow equipment to be inserted. It is usual, when creating a tapping in this way to install a gate valve or similar device to provide a method of shutting off the opening.

At lower pressures and with smaller diameter devices it is possible to insert equipment through the tapping by mounting it on the end of a rigid or semi-rigid rod which passes through a sealing gland and pushing it, by hand, through the opening and into the vessel.

This technique has a number of limitations:
(1) at high pressures the force required to push the rod becomes too high to hold easily raising the possibility of damage to the equipment or injury to the operator;
(2) a method must be provided to restrain the rod once it is at the correct position;
(3) only small diameter rods can be used otherwise the insertion force becomes too great;
(4) the use of a rigid rod limits the distance to which the equipment may be inserted;
(5) when used in pipes the tapping must be made in the end or at a shallow angle to the centre line of the pipe to reduce the angle through which the rod must bend to travel along the pipe.

In GB1531213A there is disclosed a gas main stopper which provides apparatus for injecting a stopper into a gas main, the stopper expanding after injection to cut of the gas flow. EP0524770A1 and U.S. Pat. No. 5,082,026A disclose a pipe plugging means.

We have made a number of improvements to the way in which equipment can be deployed into fluid containers and conduits in order to abate or even eliminate the disadvantages described above. In particular we have found a way to deploy equipment within a container or conduit which involves the use of a fluid pressure higher than the pressure in the container or conduit to cause the equipment to be deployed or to cause a guide for the equipment to be deployed. Our invention allows equipment to be deployed in pressurised containers and conduits without first releasing the pressure therein.

The equipment used to inspect the interior of fluid containers and conduits is often mounted on an umbilical cable. There will generally be a frictional force resisting the pushing of the equipment and the cable into the container or pipe. Furthermore, when the fluid in the container or conduit is pressurised; the pressure tries to force the cable out through the entry point into the container or conduit.

We have now found an improved way to deploy equipment in pipes containing pressurised fluids. We have also found a way to force an elongate member such as a cable into a container or conduit against the opposing forces while minimising the risk that the elongate member will buckle when it is being forced into the container or conduit. This involves keeping the elongate member laterally supported against buckling until it is fed to its selected destination.

We have found that equipment can be effectively deployed in a fluid container or conduit by moving a piston within a housing attached to the container or conduit, the piston being secured either to the equipment itself and/or to a guide for the equipment, whereby movement of the piston can move the equipment and/or the guide into the container or conduit. In an especially preferred embodiment the piston is moved by means of a fluid pressure differential created across the piston, one side of the piston being in fluid communication with the container or conduit, and being at substantially the same pressure as the container or conduit.

According to one aspect of the invention there is provided an apparatus for deploying equipment in a fluid container or fluid conduit, comprising: a fluid housing having an outlet aperture, the fluid housing being adapted to be secured to the container or conduit such that the outlet aperture is in fluid communication with an aperture in the container or conduit. Preferably a piston is disposed in the fluid housing dividing the fluid housing into first and second fluid chambers, the second fluid chamber being in fluid communication with the interior of the container or conduit via the outlet aperture when the fluid housing is secured to the container or conduit. The piston is preferably movable within the fluid housing towards the outlet aperture in response to an increase of fluid pressure in the first fluid chamber. Preferably a guide means os provided for guiding deployment of the equipment into the container or conduit, the guide means being secured to the piston, whereby movement of the piston within the fluid housing can move the guide means at least partially into the container or conduit through said outlet aperture.

Preferably, the guide means comprises a guide tube through which the equipment can be deployed into the container or conduit. Most preferably, guide tube is a wire reinforced hose.

The equipment would normally be deployed in the container or conduit on a flexible carrier. In the present invention, when the equipment is inserted into a conduit, such as a pipe, the equipment would normally be inserted at an angle, such as 90°, to the longitudinal axis of the conduit. This means that the carrier has to bend round through, for example, 90°, in order to follow the longitudinal axis of the pipe. In order to assist with this we prefer that the guide means is sufficiently flexible that it can bend when deployed in the container or conduit. This allows the carrier to bend into the longitudinal axis of the conduit in a curve which is not as tight as if the guide means were rigid.

Desirably, the guide means has a free end which is provided with a protective fitting. It is the free end of the guide means which is first inserted through the outlet aperture of the fluid housing and into the pipe. The protective fitting helps to prevent damage to the free end during insertion into the pipe. Most preferably, the protective fitting is a metal ferrule.

The fluid housing may include an inlet aperture through which the equipment can be inserted into the fluid housing. The inlet aperture is preferably provided with a fluid-tight seal to prevent the egress of fluid from the fluid housing during insertion of the equipment into the fluid housing.

In one embodiment, the apparatus further comprises a fluid reservoir in fluid communication with the first fluid chamber, and a pump for pumping fluid from the fluid reservoir to the first fluid chamber in order to move the piston towards the outlet aperture. The pump may be a hand pump, and the fluid reservoir may be a self-contained reservoir provided in the hand pump. Alternatively, the pump may be a powered pump (e.g. powered by a battery, a generator, a mains current supply, or an internal combustion engine).

In another embodiment, the apparatus further comprises means to place the first fluid chamber in fluid communication with the fluid within the container or conduit, and a booster pump for pumping fluid from the container or conduit to the first fluid reservoir in order to move the piston towards the outlet aperture.

Preferably, the apparatus further comprises a flow restriction which restricts the rate at which fluid can flow out of the first fluid chamber. This flow restriction may be provided in a fluid line between the first chamber and the pump, or in a fluid line between the pump and the fluid reservoir, or in a fluid line between the booster pump and the container or conduit, or in the pump itself. The flow restriction may simply comprise a region of sufficiently small diameter to limit fluid flow to a desired maximum rate. This acts as a safety mechanism in the event of a failure in the apparatus, because it restricts the rate at which the piston can move away from the outlet aperture under the pressure of the fluid in the container or conduit.

The carrier for the equipment is generally elongate, and may comprise a length of cable. The carrier can be adapted to be secured to the equipment, whereby the equipment can be deployed by pushing the carrier through the fluid housing inlet aperture, through the fluid housing outlet aperture, and into the container or conduit.

Preferably, the carrier is sufficiently stiff to be pushed into the container or conduit, through the fluid housing, without buckling. However, the carrier generally needs to be sufficiently flexible to allow it to bend when inserted into the container or conduit. Preferably also, the carrier is selected to be neutrally buoyant when disposed in the fluid in the container or conduit—this reduces the amount of drag experienced by the carrier. The carrier may contain signal and power cores therein, and these may be protected by the provision of an integral strain relief core in the carrier. The carrier may be provided with a protective outer sheath to protect it from mechanical damage while being used.

Preferably, the apparatus further comprises a winch assembly for pushing the carrier through the fluid housing, the winch assembly comprising a rotatable wheel having a peripheral surface with a recess adapted to receive the carrier therein, and means to press the carrier into engagement with the rotatable wheel within the recess.

The means to press the carrier into engagement with the rotatable wheel preferably comprises at least one guide wheel which is adapted to be forced into contact with the carrier. It is desirable that there is more than one guide wheel.

Preferably, the apparatus further comprises a chamfered guide tube through which the carrier is passed prior to being passed to the fluid housing.

The carrier may be wrapped half or less of the circumference of the rotatable wheel, but it is preferred that the carrier is wrapped one or more times around the rotatable wheel.

The apparatus preferably also comprises a drive means for rotating the rotatable wheel, and the drive means preferably has a maximum drive force which is set at a level below the compressive force which would cause the carrier to buckle. The drive means is preferably a drive motor, most preferably a hydraulic motor. The use of a hydraulic motor allows the maximum torque that may be applied to the system to be set by setting the maximum hydraulic oil pressure supplied to the motor.

Desirably, a groove alignment guide is provided for guiding the carrier into alignment with the groove in the rotatable wheel.

Means may be provided to measure the distance travelled by the carrier. The measuring means may be, for example, a wheel which is disposed in contact with the carrier, and which rotates freely upon movement of the carrier.

It is preferred that the carrier has a minimum bend radius equivalent to or less than the radius of the rotatable wheel.

The winch assembly can be used to insert the carrier and equipment into the fluid housing and the container or conduit, and also to remove the carrier subsequently (by reversing the direction of rotation of the rotatable wheel).

Preferably, the apparatus further comprises a drogue adapted to be secured to the equipment or carrier, in such a way that when the equipment is deployed in the container or conduit, the drogue is deployed in the container or conduit ahead of the equipment.

It is preferred that the drogue is collapsible, so that it can be deployed through the guide tube in its collapsed state, and can adopt its open state when in the container or conduit. In a container or conduit with a flowing fluid, the drogue may help to pull the equipment in the direction of fluid flow.

The apparatus may further comprise a valve which is secured to the fluid housing in fluid communication with the outlet aperture, and which is adapted to be secured to the container or conduit in fluid communication with the aperture therein. The valve is conveniently a gate valve.

Some containers or conduits may have an existing valve with an aperture already provided—for example, UK water mains may be provided with a 50 mm tapped hole and 50 mm gate valve at regular intervals. In this situation, the apparatus according to the invention would not usually need to be provided with its own valve.

According to another aspect of the invention there is provided a method of deploying an article in a fluid container or fluid conduit, comprising securing a deployment apparatus to the container or conduit, the deployment apparatus comprising a fluid housing having an outlet aperture that is in fluid communication with an aperture in the container or conduit when the apparatus is secured to the container or conduit, and a preferably a piston dividing the fluid housing into first and second fluid chambers, the second fluid chamber being in fluid communication with the interior of the container or conduit via the outlet aperture when apparatus is secured to the container or conduit, and preferably a guide means secured to the piston; increasing the fluid pressure in the first fluid chamber in order to move the piston towards the outlet aperture and thereby move the guide means through the outlet aperture at least partly into the interior of the container or conduit; and guiding the deployment of the equipment in the container or conduit using the guide means.

Preferably, the guide means comprises a guide tube, and the equipment is deployed in the container or conduit by moving it through the guide means. The fluid housing preferably includes an inlet aperture, and the equipment is preferably moved into the guide means through the inlet aperture.

It is preferred that the equipment is deployed into the conduit at an angle, preferably 90°, to the longitudinal axis of the conduit. It is further preferred that the equipment is moved into alignment with a centre line of the conduit after it has been deployed in the conduit. This movement may be assisted by fluid flow within the conduit.

According to another aspect of the invention, there is provided apparatus for deploying equipment in a fluid container or fluid conduit, comprising: a fluid housing having an outlet aperture, the fluid housing being adapted to be secured to the container or conduit such that the outlet aperture is in fluid communication with an aperture in the container or conduit. Preferably a piston is disposed in the fluid housing dividing the fluid housing into first and second fluid chambers, the second fluid chamber being in fluid communication with the interior of the container or conduit via the outlet aperture when the fluid housing is secured to the container or conduit, the piston being movable within the fluid housing in response to an increase of fluid pressure in the first fluid chamber. The piston is preferably adapted to be secured to the equipment, whereby movement of the piston within the fluid housing can deploy the equipment at least partially in the container or conduit through said outlet aperture.

Preferably, the equipment is adapted to be secured to the pipe by means of an elongate rigid or semi-rigid support which is secured to the piston.

According to another aspect of the invention there is provided a method of deploying an article in a fluid container or fluid conduit, comprising securing a deployment apparatus to the container or conduit, the deployment apparatus comprising a fluid housing having an outlet aperture that is in fluid communication with an aperture in the container or conduit when the apparatus is secured to the container or conduit. Preferably a piston divides the fluid housing into first and second fluid chambers, the second fluid chamber being in fluid communication with the interior of the container or conduit via the outlet aperture when apparatus is secured to the container or conduit. Preferably the method further includes the steps of securing the equipment to the piston and increasing the fluid pressure in the first fluid chamber in order to move the piston towards the outlet aperture and thereby move the equipment through the outlet aperture at least partly into the interior of the container or conduit.

The winch assembly described above need not necessarily be employed with the rest of the apparatus. The winch assembly may be used in any situation where it is desired to push an elongate member, such as a cable, rope or tube, against an opposing force. Thus, in accordance with another aspect of the invention there is provided a winch assembly for feeding an elongate member to a selected destination, comprising a rotatable wheel having a peripheral surface with a groove therein, the elongate member being received within the groove, and means to press the elongate member into engagement with the rotatable wheel.

The rotatable wheel may be any desired size, for example from 200 mm, or less, up to 1 m, or more, in diameter. We have found that a diameter of 300 mm to 400 mm, for example 350 mm, is particularly convenient.

The winch assembly according to this aspect of the invention may be provided with the same features as the winch assembly described in more detail above.

The equipment may be mounted at the end of the carrier, or at some point along the length of the carrier. It is possible to use a number of items of equipment each mounted at intervals along the length of the carrier. In one preferred embodiment, the equipment comprises a sensor, such as an acoustic sensor. The equipment may instead, or in addition, comprise a transmitter, such as an acoustic transmitter. It is possible for the equipment to form a section disposed between two adjacent sections of the carrier. The equipment may be integral with the carrier.

It will be appreciated that it is possible to use many different fluids in the first chamber, and that the invention can be used to deploy equipment into containers or conduits containing many different types of fluid. The fluids may be liquids or gases. The invention is particularly suitable for use with pressurised fluids. The equipment can be used with fluids at a wide variety of pressures such as about atmospheric pressure up to about 1 MPa (10 bar). Typically, the pressure would be in the range 200 kPa to 1 MPa (2 to 10 bar), more typically 200 kPa to 600 kPa (2 to 6 bar).

Whilst the invention may be used with any form of container or conduit, it is especially useful for inserting equipment into water mains. In this case, the fluid in the first chamber is preferably also water in order to reduce the risk of contamination of the water main.

It is known to use a drogue for carrying equipment in conduits containing a flowing fluid. The drogue is shaped such that the flowing fluid creates a high enough drag force on the drogue to carry the drogue and any attached equipment along the conduit. As the drogue moves along the conduit it tends to spin, and this can cause it to rotate and collapse. To prevent this, drogues are usually connected to the equipment by means of a connection that enables the drogue to spin independently of the equipment; this connection is typically a swivel joint.

The equipment would normally be attached to an elongate carrier for retrieval of the equipment. However, retrieval of the equipment can be difficult, as the drogue continues to impose a force tending to move the equipment along the conduit. The retrieval equipment needs to be able to overcome this force. We have now found a way to avoid this problem.

According to another aspect of the invention, we provide apparatus for deployment in a conduit containing flowing fluid comprising a drogue secured to equipment by means of an elongate connector, the drogue having a collapsed state and having an uncollapsed state in which it helps to drag the equipment along the pipe in the direction of fluid flow, the elongate connector being secured to the equipment in such a manner than the connector can freely rotate relative to the equipment, wherein means are provided for selectively preventing the elongate connector from rotating relative to the equipment in order to collapse the drogue. When the elongate connector is prevented from rotating, the drogue will still continue to rotate; this will cause the drogue to collapse, thereby reducing the drag force when the equipment is retrieved from the conduit.

The equipment will normally be secured to an elongate carrier which can be paid out as the equipment moves along the conduit, and with can be pulled in to retrieve the equipment.

The elongate connector may comprise at least one, preferably at least two cables secured between the equipment and the drogue.

The elongate connector is preferably secured to the equipment by means of a swivel joint.

The means to selectively prevent rotation of the elongate connector may be any convenient means suitable to prevent said rotation, and depends upon the way in which the elongate connector is rotatably connected to the equipment. For example, when a swivel joint is used, an electromagnetic clutch or locking pin may be provided to selectively prevent rotation.

The apparatus according to this aspect of the invention may be deployed using the deployment apparatus described above.

The invention also provides a method of retrieving equipment deployed on an elongate carrier in a conduit containing flowing fluid, the equipment having a drogue attached thereto, the method comprising collapsing the drogue prior retrieving the equipment. The drogue can be collapsed by allowing it to wind up on a tether by means of which it is secured to the equipment.

There are currently a number of techniques used for the detection of leaks in pipes. These range from monitoring the flow in the pipe networks at periods when low or zero flows are expected or are deliberately arranged, through to more precise leak location methods such as the well established technique of leak noise correlation.

Leak noise correlation in its usual form uses two acoustic transducers placed either in contact with the pipe or with the pipe contents using access such as a water pipe hydrant for water pipes. The transducers are sited at different positions along the pipeline on either side of a suspected leak position and the detected noise from the leak is cross-correlated to give the approximate position of the leak. This method suffers from several drawbacks, such as poor accuracy in determining the leak position, and limited range—the range is especially low in large diameter pipes of all kinds and non-metallic pipes such as plastic or asbestos cement.

GB-A-1452788 discloses a method of detecting and locating leaks in tanks and pipes, in which a probe bar carrying two acoustic sensors is disposed in the tank or pipe. The sensors are rotatable about a common axis until a maximum signal product is received from the two sensors, then the location of the leak is judged from the position of the sensors. In order to determine the leak position accurately it is desirable to insert the probe bar into the tank or pipe at a number of different locations.

U.S. Pat. No. 3,561,256 discloses an apparatus for detecting leaks in pipes. The apparatus comprises two acoustic sensors mounted on a pig which is run along the pipe. A sound absorbent canister is disposed between the two sensors.

U.S. Pat. No. 4,471,651 discloses an apparatus for detecting leaks in a telephone cable, which involves moving an acoustic sensor on a rod along the inside of the telephone cable.

We have now found a more effective way of locating leaks in pipes.

According to another aspect of the present invention there is provided a method for detecting and/or locating leaks in a pipe which comprises moving two acoustic sensors along the pipe, generating signals corresponding to acoustic signals received by each of said acoustic sensors, and transmitting the generated signals from each of the acoustic sensors to a respective loudspeaker.

Thus, the acoustic signals received by one acoustic sensor are represented on one loudspeaker, and the acoustic signals received by the other acoustic sensor are represented on the other loudspeaker, so that an operator who is correctly positioned in relation to the loudspeakers can detect changes in the strength of the signals received by each acoustic sensor. Thus; the presence of a leak can be detected by a change in the signal reproduced by each loudspeaker; and the position of a leak can be determined as the position in which the signals reproduced by each loudspeaker appear to have the same amplitude.

The generated signals may be generated by an appropriate transducer. The sensor/transducer usually comprises a single unit which performs the detection and the energy conversion functions. For example, the sensors/transducers are typically piezoelectric ceramics which convert the acoustic energy into electrical energy which may then be pre-amplified. Such equipment is entirely conventional. The generated signals may be transmitted to the surface via electrical conductors disposed in the carrier. Although the generated signals will be electrical signals, they could instead be optical signals, radiowave signals, microwave signals, etc.

The acoustic sensors may be moved along the pipe while recording the distance travelled and simultaneously transmitting the electrical signals to the loudspeakers.

In the preferred embodiment the loudspeakers are provided in the form of headphones which can be worn by the operator.

It is preferred that the generated signals are cross-correlated, and it is also preferred that the cross-correlated signals are displayed on a suitable display. This display of the signals provides an additional aid to the operator in locating the leaks. Furthermore, when there are two or more leaks in close proximity, the display will help the operator to recognize them, as there will be more than one peak displayed—this may not be clear from the aural information alone.

According to another aspect of the present invention there is provided apparatus for detecting and/or locating leaks in a pipe, comprising two acoustic sensors adapted to be disposed in the pipe in spaced relationship to one another, and for converting acoustic signals received by the acoustic sensors into corresponding further signals; and two loudspeakers, each loudspeaker being arranged to receive the further signal generated by a respective one of said sensors.

In the preferred embodiment the loudspeakers are provided in the form of a set of headphones.

Preferably, the apparatus further comprises cross-correlation means for cross-correlating the signals produced by each transducer, and display means for displaying the results of the cross-correlation. The display means may comprise a conventional VDU.

The further signals may be generated by an appropriate transducer. The sensor/transducer usually comprise a single unit which performs the detection and the energy conversion functions. For example, the sensors/transducers are typically piezoelectric ceramics which convert the acoustic energy into electrical energy which may then be pre-amplified.

In general, we prefer that the further signals are produced in the form of electrical signals, but they could be produced in any convenient form, including optical signals (for use with a fibre optic cable), radiowave signals, microwave signals, etc. Clearly, if radiowave or microwave signals are used, then appropriate transmitters and receivers will be required.

The leak detection/location apparatus may also include a deployment apparatus having any combination of the features of the deployment apparatus described above. This provides a convenient way to deploy the leak detection/location apparatus in a pipe. In particular the acoustic sensors and the transducers may be provided on the carrier described above, and may be forced into the pipe using the winch assembly described above. Also, as described above, a drogue can be attached to the carrier to increase the drag flow on the carrier. If desired, additional drogues may be mounted along the carrier to increase further the drag of the flow on the carrier. However, it is not essential to deploy the acoustic sensors and transducers using the deployment apparatus described above.

Preferably, the apparatus further comprises a test signal and balance control unit to enable the operator to correct for any imbalance in his or her hearing between each ear.

It is preferred that means is provided to enable the frequency of the acoustic signals to be either increased or decreased to place it into a range that is detectable by the human ear. This can be achieved in a suitable signal conditioning unit, which can include appropriate means such as mixing and low pass filtering to transform any detected signals which are above the normal maximum audio frequency of 20,000 Hz to frequencies below 10,000 Hz to render them audible by most operators. This technique will improve the positioning accuracy of the apparatus when the acoustic sensors are close to a leak.

One preferred way of displaying the cross-correlation is to show on the screen a bar to represent the distance between the two transducers with a marker to indicate the position of the leak relative to the transducers which corresponds to the main peak in the cross correlation function.

The cross correlation $R_{xy}(T)$ of the signals x(t) and y(t) originating at the two transducers, $$R_{xy}(\tau) = \text{limit } 1/T \int_0^\tau x(t) \cdot y(t+\tau) \cdot dt$$

T→' where t is time

T is the measurement period

τ is the delay between the two signals.

The cross correlation function can be implemented digitally using sampled signals and is operated over a delay range corresponding to the time taken for the acoustic energy to travel between the transducers. The signals from the two transducers are preferably conditioned to provide amplification and band limiting prior to cross correlation.

There are a number of ways in which the cross-correlation function may be implemented. For example, the data may be digitised to 1 bit using zero crossing detection if the signal average value is zero. The cross-correlation function is then reduced to:

$$R_{xy}(j\Delta t) = \sum_{n=1}^{N} \text{sgn } x_n \text{ sgn } y_{n-j}$$

where the 1/N has been removed as it is of no importance when finding the function peaks.

In accordance with the invention, the sensors may be placed at any convenient distance apart provided they function to allow a leak to be located between them. For example, a separation of 1 m for a water pipe may be used. If the equipment is travelling very rapidly along the pipe a sensor separation greater than 1 m may be beneficial, so that the leak will be located between the sensors for a longer time, the sample interval Δt should normally be much less than the time taken for the sound to travel between the fluid sensors in the pipe fluid; for example, a sample interval of 100 kHz may be used. To improve the leak location accuracy, increasing numbers of samples N may be taken with the sensors stationary in the pipe.

In most pipelines there will be sources of noise in addition to the leak noise and for all noise sources except those sited between the two transducers, the noise will produce peaks at the ends of the cross-correlation function, corresponding to the fixed time taken for the noise to travel between the sensors. These peaks should be ignored by the operators of the apparatus, or may be removed in the system software.

Once the acoustic receivers have been positioned at a known distance relative to the leak, the location of the leak in relation to the surroundings of the pipe. i.e., the ground in the case of an underground water main) can be determined, for example by using a sonde type device connected to the cable near the acoustic receivers (typically disposed midway between the acoustic receivers) with the operator finding the sonde using a suitable detector outside the pipe.

According to another aspect of the present invention there is provided a method for detecting and/or locating leaks in a pipe which comprises moving two acoustic sensors along the pipe, generating signals corresponding to acoustic signals received by each of said acoustic sensors, and cross-correlating the signals, wherein the signals are cross-correlated over a delay range corresponding to the time taken for the acoustic energy to travel between the sensors.

The invention may be used to find leaks in pipes other than underground pipes, such as sub-sea pipes, which may or may not lie under the seabed, and pipes laid above ground.

Reference is now made to the accompanying drawings, in which.

Figure 1:
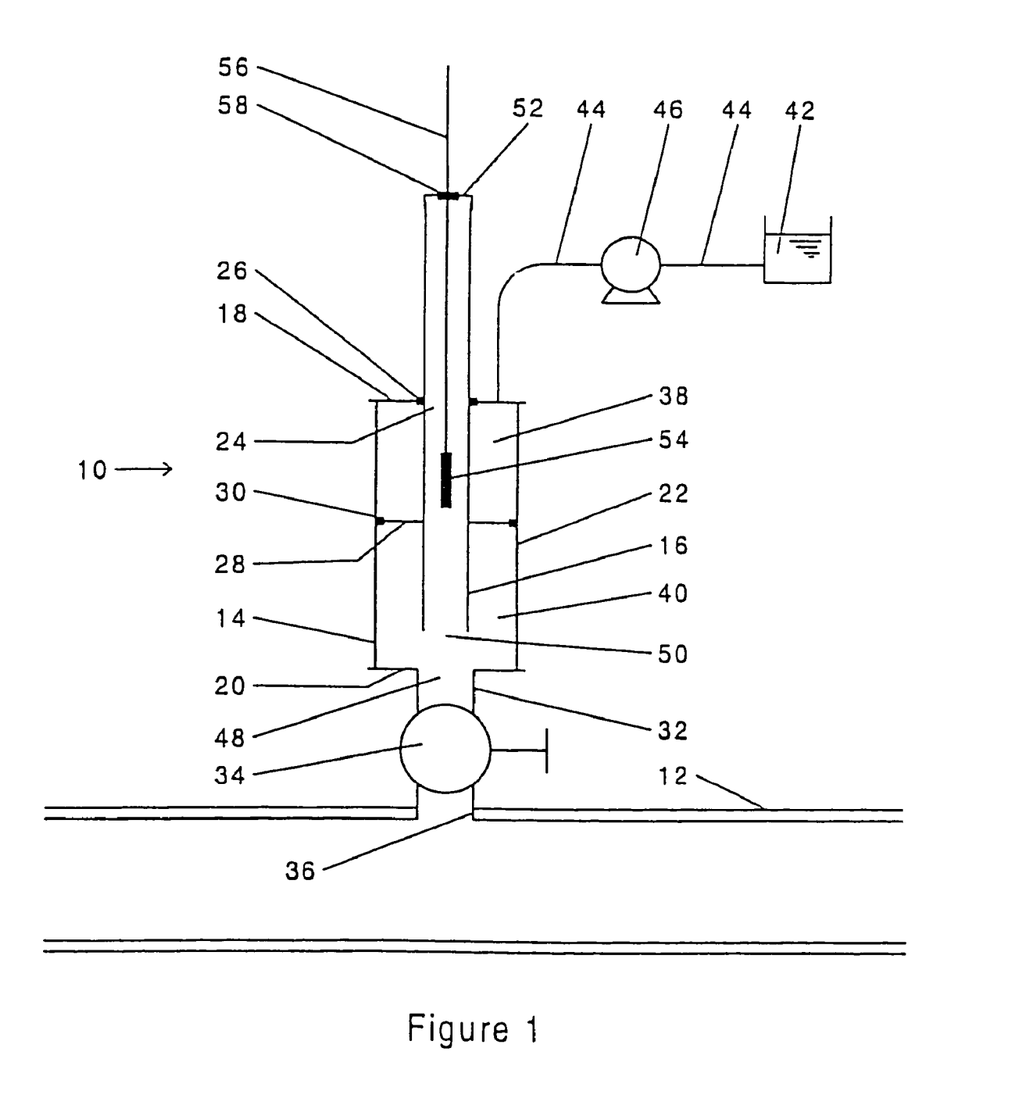
FIG. 1 is a schematic cross sectional view of one embodiment of apparatus according to the invention for deploying equipment into a pipe.

FIG. 1 shows one embodiment of an apparatus 10 in for deploying equipment 54 into a fluid container or fluid conduit 12. For convenience, the term "container" is used herein to indicate a container or a conduit. As depicted in FIG. 1, the container 12 is a pipe. The pipe 12 may be, for example, a water main.

The apparatus comprises a fluid housing 14 which functions as a hydraulic cylinder. A guide means in the form of a guide tube 16 is disposed within the fluid housing 14. The fluid housing 14 is provided with end walls 18 and 20, and a side wall 22 extending between the end walls 18 and 20. An inlet aperture 24 is provided in the end wall 18, through which the guide tube 16 extends. The edges of the aperture 24 are provided with a seal 26 which provides a fluid-tight seal between the end wall 18 and the guide tube 16.

The guide tube 16 is provided with a flange 28 which functions as a hydraulic piston within the fluid housing 14. The periphery of the piston 28 is provided with a seal 30 which provides a fluid-tight seal between the piston 28 and the side wall 22 of the fluid housing 14. The guide tube 16 and the piston 28 are freely movable as a single unit within the fluid housing 14.

The arrangement is such that the guide tube 16 can move through the aperture 24 relative to the fluid housing 14, while the seals 26 and 30 prevent the flow of fluid between the guide tube 16 and the fluid housing 14 during said movement. The seals 26 and 30 may each comprise a single rubber 'O' ring.

The end wall 20 is provided with a connector 32 which is adapted to be connected to a gate valve 34. The connector 32 may be integral with the end wall 20, and may be connected to the valve 34 by means of screwthreads (not shown). As an alternative the connector 32 may be removable from the fluid housing 14 to allow different connectors 32 to be used, depending upon the size of the connection to the gate valve 34.

The gate valve 34 can be secured to the pipe 12 by means of a tapping (not shown). The tapping may comprise a screwthreaded annular plug (not shown) disposed in an aperture 36 in the pipe 12.

The piston 28 divides the volume within the fluid housing into first and second fluid chambers 38 and 40. The first fluid chamber 38 is disposed between the end wall 18 and the piston 28, and the second fluid chamber is disposed between the end wall 20 and the piston 28.

The first fluid chamber 38 is in fluid communication with a fluid reservoir 42 via a fluid line 44. A pump 46 is disposed in the fluid line 44 for pumping fluid from the fluid reservoir 42 to the first fluid chamber 38. Instead of providing the fluid reservoir 42, the fluid line 44 may be placed in fluid communication with the interior of the pipe 12, and the pump 46 may be a booster pump to provide the additional pressure needed to move the guide tube 16 relative to the fluid housing 14, as described in greater detail below. For example, fluid line 44 may be in communication with fluid in the pipe 12 via a connection above or below the gate valve 34. The fluid in the reservoir 42 may be a liquid or gas, depending on the circumstances. In general we prefer to use a fluid in the reservoir 42 which is the same as the fluid in the pipe 12.

The second fluid chamber 40 is in fluid communication with the interior of the pipe 12 through an outlet aperture 48 provided in the end wall 20.

The guide tube 16 has an open end 50 and a closed end 52. The open end 50 may be provided with a protective fitting (not shown), such as a metal ferrule, to protect the open end 50 when it is being moved into and out of the pipe 12. The item of equipment 54 is disposed on an equipment carrier 56, such as a cable or rod, which extends through an aperture in the closed end 52 of the guide tube 16. The edges of this aperture are provided with a seal 58 which provides a fluid-tight seal between the closed end 52 and the equipment carrier 56. Provided that the outer surface of the carrier 56 is smooth, the seal 58 may comprise a single rubber 'O' ring.

When the equipment 54 is small enough it can be pushed straight through the seal 58 with the carrier 56. If the equipment 54 is too large to be pushed through the seal 58, it may be attached to the carrier 56 after the carrier has been pushed through the seal 58; alternatively, the embodiment of FIG. 2 may be used instead.

The way in which the apparatus 10 is used will now be described with reference to FIG. 1. First, an appropriate tapping is made in the pipe 12, and the gate valve 34 is secured to the tapping. For some containers and conduits the gate valve 34 is preinstalled. If the equipment 54 cannot be pushed through the seal 58, then the carrier 56 must be pushed through the seal 58, and the equipment 54 must be attached to the carrier 56, prior to securing the connector 32 to the gate valve 34. If the equipment 54 can be pushed through the seal 58, then the connector 32 may be secured to the gate valve 34, prior to pushing the equipment 54 and the carrier 56 through the seal 58.

When the equipment 54 has been disposed within the guide tube 16, and the connector 32 has been secured to the gate valve 34, the valve 34 can be opened and the pump 46 can be activated to pump fluid from the reservoir 42 (or, in an alternative embodiment, from the interior of the pipe 12) to the first fluid chamber 38. When the pressure in the chamber 38 exceeds the pressure in the chamber 40, the piston 28 will begin to move towards the outlet aperture 48. The movement of the piston 28 causes corresponding movement of the guide tube 16, until the guide tube 16 is partly disposed within the interior of the pipe 12. It will be appreciated that the piston 28 will move downwardly provided that the pressure in the first chamber 38 is sufficiently greater than the pressure in the second chamber 40 to overcome the frictional forces holding the piston 28 in position.

The carrier 56 is then pushed further into the guide tube 16 in order to move the equipment 54 into the pipe 12; the guide tube 16 guides movement of the equipment 54 into the pipe 12. The carrier 56 is flexible so that it tends to be bent under the influence of the fluid flowing through the pipe 12. If the fluid flow is not sufficient to bend the carrier, or if there is no fluid flow, the equipment 54 eventually comes into contact with the pipe wall opposite the pipe aperture 36. This causes the carrier 56 to bend in the pipe 12, so that the equipment 54 can subsequently be pushed along the length of the pipe 12.

Figure 5:
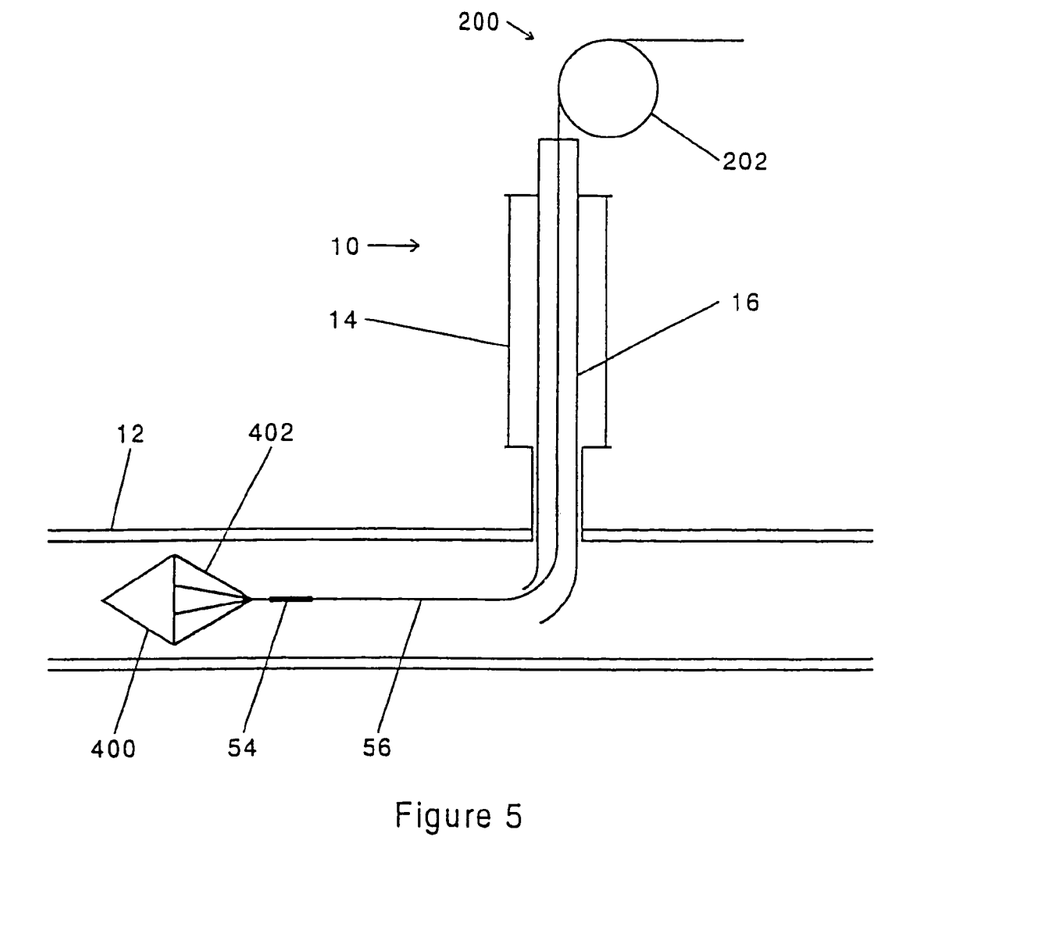
FIG. 5 illustrates the equipment deployed in the pipe.

At least the lower part of the guide tube 16 is preferably made of a flexible material so that it can bend with the carrier 56 as the carrier bends. This allows the carrier 56 to adopt a less tight curve than would be necessary if the guide tube 16 were rigid—this is illustrated in FIG. 5.

The fluid in the first fluid chamber 38 may be released by opening a connection (not shown) allowing the fluid pumped in to run to waste or returning it to the reservoir 42 or to the pipe 12.

If the connection between the pump 46 and the fluid line 44 is made using a small diameter connecting pipe the guide tube 16 will only be able to return to the fully retracted position slowly even if the apparatus 10 is damaged as it must force the fluid out through a small orifice. This feature prevents the inner part from moving quickly and reduces the risk of the equipment causing damage or injury.

The deployment apparatus 10 allows deployment of equipment several kilometres along a pipe on the end of a cable.

Figure 2:
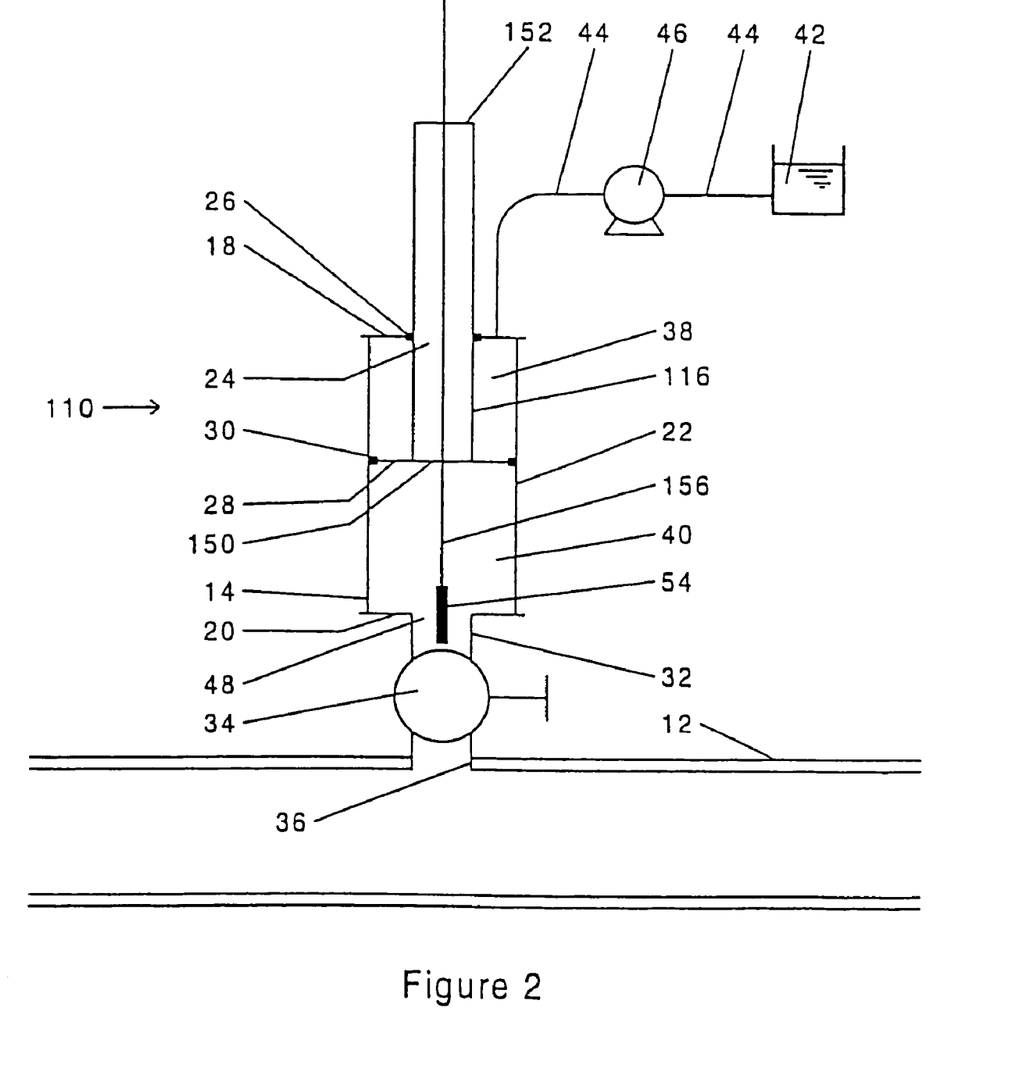
FIG. 2 is a schematic cross sectional view of another embodiment of apparatus according to the invention for deploying equipment into a pipe.

FIG. 2 shows another embodiment of an apparatus 110 for deploying the equipment 54 into the pipe 12. The apparatus 110 is similar to the apparatus 10 and many of the parts may be substantially identical. Accordingly, like parts have been designated with like reference numerals. The main difference is that in the embodiment of FIG. 2 the guide tube 16 has been replaced with a guide tube 116 which is shorter than the guide tube 16, and which has two closed ends 150 and 152. Furthermore, the carrier 56 has been replaced by a carrier 156 which is secured to the underside of the closed end 150, in such a way that the equipment 54 is initially disposed within the fluid housing 14. In the embodiment of FIG. 2, movement of the guide tube 116 downwardly towards the gate valve 34 directly causes the equipment 54 to be inserted into the pipe 12, and movement of the guide tube 116 upwardly away from the gate valve 34 directly causes the equipment 54 to be withdrawn from the pipe.

The embodiment shown in FIG. 1 is most useful for small diameter equipment (i.e. with equipment having a similar diameter to the carrier 56), as the equipment can then be deployed by pushing it through the seal 58. For large diameter equipment (particularly for equipment having a diameter close to the diameter of the aperture), it is preferred to use the embodiment shown in FIG. 2.

It is possible to use the FIG. 2 embodiment with equipment 54 connected to the carrier 56 as in FIG. 1. In this alternative, the downward movement of the piston 28 injected the equipment into the pipe 12, then the carrier 56 can be further pushed down in order to inject the equipment further into the pipe 12.

Figure 3:
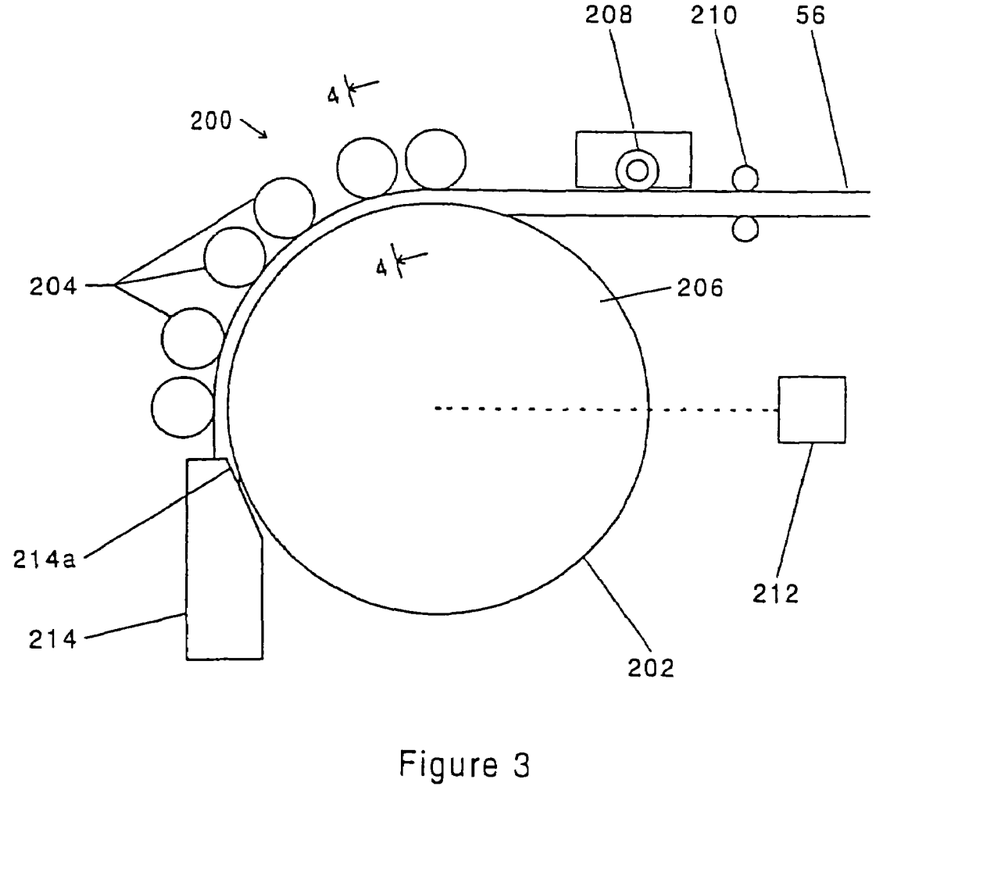
FIG. 3 illustrates a winch assembly suitable for use with the apparatus shown in FIG. 1.
Figure 4:
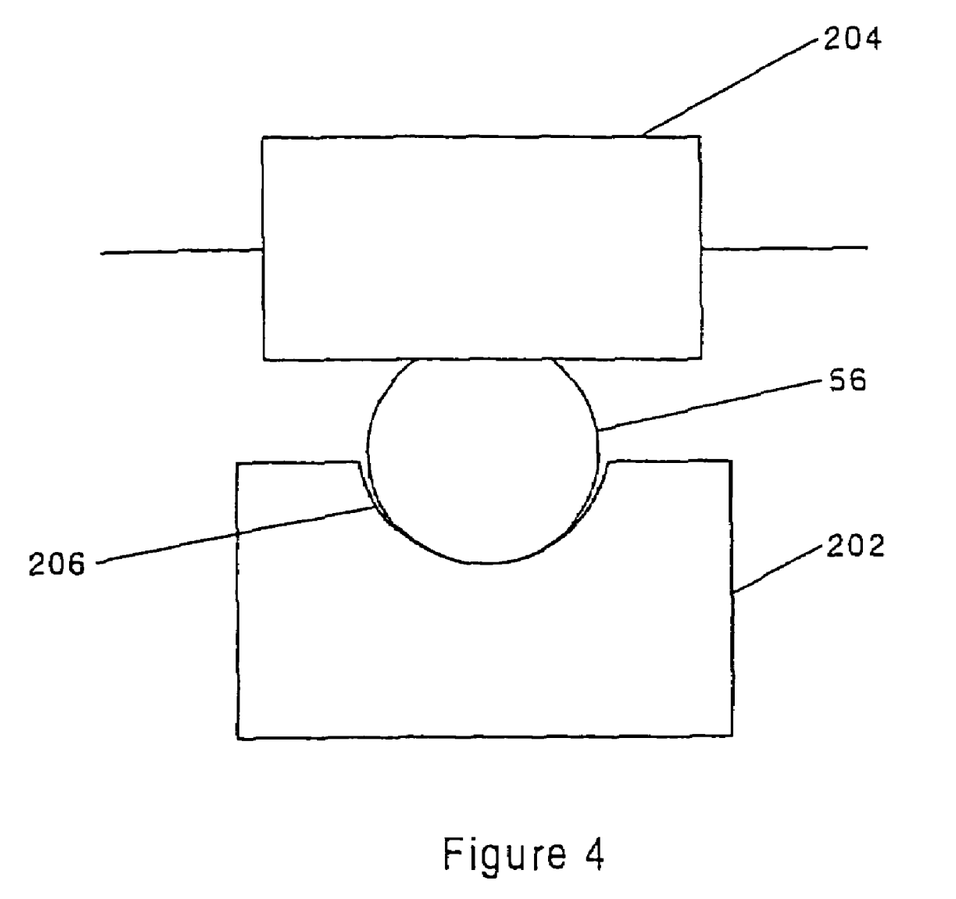
FIG. 4 illustrates a view along lines 4-4 of FIG. 3.

FIGS. 3 and 4 illustrate a winch assembly 200 for pushing the carrier 56 into the pipe 12. The winch assembly 200 is particularly well adapted for use with the deployment apparatus 10 shown in FIG. 1, but it will be appreciated that it can be used in any situation where it is desired to push a flexible elongate member such as a cable, rope or tube in a desired direction.

The winch assembly 200 comprises a rotatable wheel 202 around which are situated a number of guide rollers 204. The wheel is typically about 350 mm in diameter. The wheel 202 is driven by a motor 212. The cable 56 is fed to a groove 206 cut around the circumference of the wheel 202 and is held in place by the guide rollers 204. The guide rollers 204 are mounted in such a way that they may be tightened down onto the cable 56 trapping it in the groove 206 in the wheel 202. The frictional force between the cable 56 and the wheel 202 ensures that when the wheel 202 is driven by the motor 212 the cable 56 moves. The frictional force may be increased by increasing the contact length of the cable 56 with the wheel 202. This may be achieved, in one embodiment, by wrapping the cable 56 once or more around the wheel 202.

The winch apparatus 200 includes a measuring wheel 208 which is in contact with the cable 56 and rotates with movement of the cable 56. The measuring wheel can be connected to a device which translates the rotation of the measuring wheel into an indication of the distance moved by the cable 56.

A groove alignment guide in the form of rollers 210 is provided to ensure the cable 56 lies correctly in the groove 206 as it goes onto the wheel 202.

The cable 56 must be chosen such that it has sufficient longitudinal strength (in compression) to allow it to be forced into the fluid chamber 14 through the seal 58. The winch assembly 200 is designed to reduce the risk of the cable 56 buckling out between the point where the cable 56 leaves the winch assembly 200 and passes through the seal 58.

When in use with the apparatus 10, the wheel 202 and guide roller 204 assembly is mounted over the insertion point into the pipe 12. An additional guide 214 is provided to guide the cable 56 as it leaves the wheel 202. The additional guide 214 is provided with a chamfered edge 214a which runs tangentially to the rotatable wheel 202 and guides the cable 56 as it comes from the wheel 202 and passes into the fluid housing 14. The chamfered edge 214a follows the edge of the rotatable wheel closely and minimises the space available for the cable 56 to buckle. The clearance of the chamfered edge 214a from the wheel 202 is typically only 2-3 mm.

FIG. 5 shows the equipment 54 deployed in the pipe 12 on the cable 56. A drogue 400 is attached to the free end of the equipment 54, and serves to help pull the equipment 54 and the cable 56 along the pipe 12 under the influence of the fluid flow in the pipe 12. The drogue 400 is preferably collapsible, in order to facilitate insertion into and removal from the pipe 12. The drogue 400 may be designed to open automatically under the influence of the fluid flow within the pipe 12.

The drogue 400 is attached to the equipment 54 and cable 56 by a number of cables or tethers 402, for example, six cables 402. The breaking strength of these cables 402 is much lower than the maximum working load of the cable 56. The drogue 400 itself is also made from a material of much lower strength than the maximum working load of the cable 56. In the event of the cables 402 or the drogue 400 being caught they can be broken and the cable and equipment safely retrieved.

Figure 6:
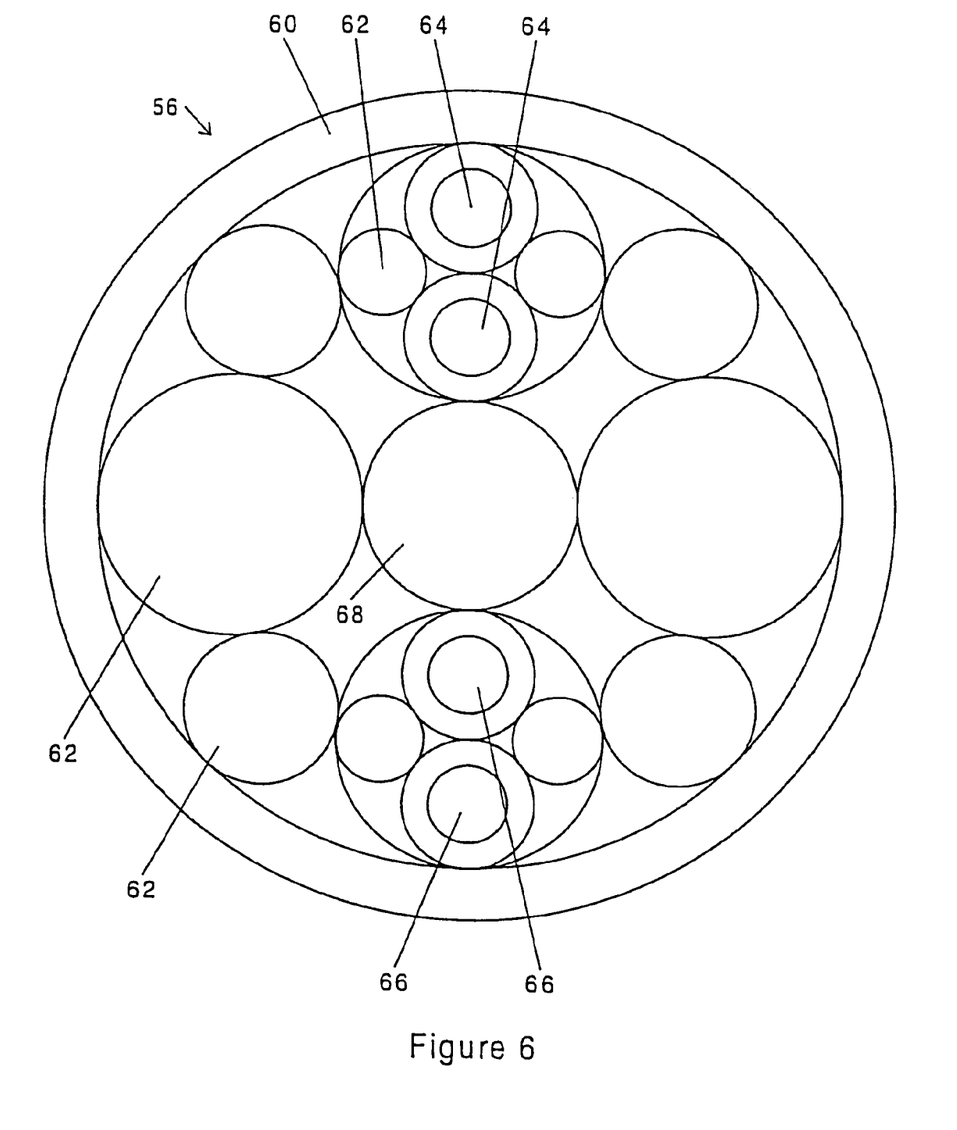
FIG. 6 is cross sectional view of one embodiment of carrier cable for use in an apparatus according to the present invention.

FIG. 6 shows the internal structure of the carrier cable 56. The cable 56 includes an outer polyurethane jacket 60 containing filler 62. First and second twisted pairs of conductors 64 and 66 are provided within the jacket 60 to enable electrical signals to be carried along the cable 56. An integral strain relief core 68 is provided along the centre line of the cable 56. It will be appreciated that many variations to the structure are possible.

Figure 7:
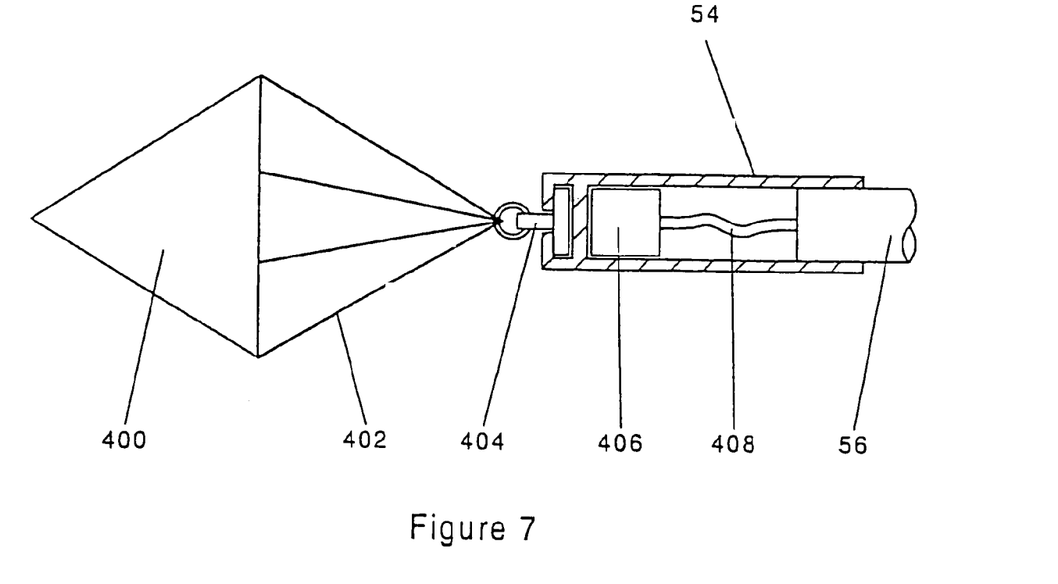
FIG. 7 is a schematic view of an embodiment apparatus for deployment in a conduit.

In FIG. 7, there is shown an embodiment of apparatus for deployment in a conduit. Many of the parts shown in FIG. 7 are identical to the parts shown in FIGS. 1 to 4, and like parts have been designated with like reference numerals.

The cables 402 are attached to a swivel joint 404 provided on the equipment 56. The swivel joint 404 allows the cables 402, and the drogue 400, to rotate relative to the equipment. This feature is necessary during deployment of the equipment 54, because the fluid flow in the pipe 12 would normally cause the drogue 400 to rotate, and without the swivel joint 404, the drogue 400 would collapse due to it winding up the cables 402.

In addition means are provided to selectively prevent rotation of the cables 402 and the drogue 400. This means comprises and electromagnetic clutch 406. The clutch 406 can be operated by means of an electrical signal passed along the carrier 56 and along an electrical connector 408 disposed within the equipment 54. When activated the electromagnetic clutch 406 acts to prevent rotation of the swivel joint 404. This prevents the cables 402 from rotating. However, the drogue 400 still tends to spin in the fluid flow and causes the drogue 400 to wind up the cables 402, thereby leading to collapse of the drogue 400. This makes retrieval of the equipment 54 much easier, as the drogue 400 does not impose such a high force in the direction opposite to the direction of retrieval. Also, the drogue 400 is less likely to become snagged in the pipe 12.

It will be appreciated that the means for preventing rotation can take a wide variety of different forms. For example, in an alternative embodiment a locking pin could be provided.

Figure 8:
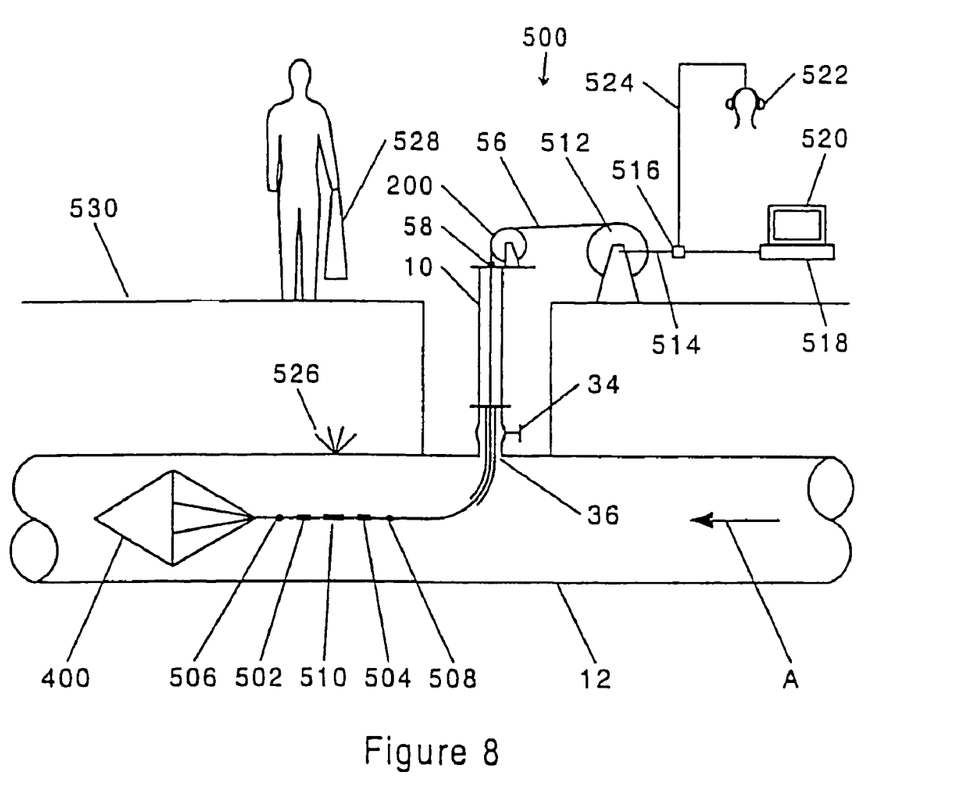
FIG. 8 is a schematic illustration of a method and apparatus for detecting and/or locating leaks in accordance with the invention.

In FIG. 8 there is shown an apparatus 500 for detecting and/or locating leaks in a pipe 12. Many of the parts of the apparatus shown in FIG. 8 are similar to the parts shown in FIGS. 1 to 4. Accordingly, like parts have been designated with like reference numerals. The main differences are as follows. In FIG. 8, the equipment to be deployed comprises first and second acoustic receivers/transducers 502 and 504, first and second pre-amplifiers 506 and 508, and a sonde 510. The first and second pre-amplifiers amplify the respective electrical signals produced by the first and second acoustic receivers/transducers.

The apparatus 500 further includes the cable drum 512 on which the equipment carrier cable 56 is reeled. The carrier cable 56 carries a strain relief core (not shown) which is connected to the drogue 400 at one end and to the cable drum 512 at the other. A slip ring is provided on the cable drum 512 to enable the signals from the pre-amplifiers 506 and 508 to be fed to a line 514 which leads to a signal conditioning unit 516 and a computer 518 which contains a signal processing equipment and a display 520. The signal conditioning unit 516 also provides an output for stereo headphones 522 worn by the operator, via a line 524.

As mentioned above, the drogue 400 is collapsible and the acoustic receivers/transducers 502, 504, the pre-amplifiers 506, 508 and the sonde 510 are of sufficiently small size to allow them to be inserted through the pipe aperture 36. A force is imparted on the drogue 400 by the flow of fluid in the pipe in the direction A, thereby pulling the carrier cable 56 and associated equipment 502, 504, 506, 508 and 510 through the pipe 12 in the direction of flow.

In operation, the carrier cable 56 moves along the pipe 12 in the direction of flow. A leak 526 in the pipe 12 produces a noise which is detected by each acoustic receiver/transducer 502, 504 over a selected bandwidth for example 100 kHz. The acoustic receivers/transducers 502 and 504 produce a corresponding electrical signal which is fed, to the pre-amplifiers 506 and 508, respectively, prior to being transmitted along the carrier cable 56 and to the signal conditioning unit 516 and then to the headphones 522 and the computer 518.

The electrical signals produced by the acoustic receivers/transducers 502, 504 are each fed to a respective one of the loudspeakers in the headphones 522. When the sound in each loudspeaker of the headphones 522 appears to be of the same amplitude (after making adjustments for any possible hearing imbalance in the operator), the leak can be judged to be midway between the acoustic receivers/transducer.

The winch assembly 200 can be controlled to stop the acoustic receivers/transducers 502, 504 close to the leak 526 to allow the operator to locate the position of the sonde 510, and hence of the leak 526, in relation to the outside of the pipe 12, using a detector 528 held by an operator above the ground 530. Alternatively the leak location may be determined with the acoustic receivers/transducers 202, 204 moving continuously using the recorded cable length to determine the leak location 526 from outside the pipe 12.

It will be appreciated that the invention described above may be modified.

What is claimed is:

1. A method for locating a leak in a pipe, the method comprising the steps of moving two acoustic sensors along the pipe, generating signals corresponding to acoustic signals received by each of said acoustic sensors, and transmitting the generated signals from each of the acoustic sensors to a respective one of two loudspeakers, and
   wherein the acoustic sensors are mounted on an elongate carrier which carries the generated signals to the loudspeakers therethrough, and wherein the acoustic sensors and the elongate carrier are inserted into the pipe through an aperture therein, and wherein a length of carrier paid out into the pipe is measured, enabling a position of the acoustic sensors indicating the leak to be measured out along a corresponding path of the pipe.

2. A method according to claim 1, wherein the acoustic sensors are moved along the pipe while recording a distance traveled by the sensors and simultaneously transmitting the generated signals to the loudspeakers.

3. A method according to claim 1, wherein the loudspeakers are headphones which can be worn by an operator.

4. A method according to claim 1, wherein the generated signals are cross-correlated, and are then displayed on a suitable display.

5. A method according to claim 4, wherein the generated signals are cross-correlated over a delay range corresponding to a time taken for the acoustic signals to travel between the sensors.

6. Apparatus for locating leaks in a pipe, the apparatus comprising:
   two acoustic sensors adapted to be disposed in the pipe in spaced relationship to one another, the acoustic sensors converting acoustic signals received by the acoustic sensors into corresponding further signals;
   two loudspeakers, each loudspeaker being arranged to receive the further signal generated by a respective one of said sensors; and
   means for adjusting a frequency of the acoustic signals into a range that is detectable by a human ear.

7. Apparatus according to claim 6, wherein the loudspeakers are a set of headphones.

8. Apparatus according to claim 6, further comprising cross-correlation means for cross-correlating the further signals, and display means for displaying results generated by the cross-correlation means.

9. Apparatus according to claim 6, further comprising a test signal and balance control unit to enable an operator to correct for imbalance in a person's hearing.

10. Apparatus according to claim 6, wherein the acoustic sensors are mounted on an elongate carrier, and wherein the acoustic sensors and the elongate carrier are capable of being inserted through an aperture in the pipe, and wherein the further signals are carried to the loudspeakers through the elongate carrier.

11. Apparatus according to claim 10, wherein a sonde is carried by the elongate carrier, a position of the sonde being detectable from outside the pipe.

* * * * *